(12) United States Patent
Huggett et al.

(10) Patent No.: US 8,797,387 B2
(45) Date of Patent: Aug. 5, 2014

(54) SELF CALIBRATING STEREO CAMERA

(75) Inventors: Anthony R. Huggett, Sherborne St. John (GB); Graham Kirsch, Bramley (GB)

(73) Assignee: Aptina Imaging Corporation, George Town (KY)

( * ) Notice: Subject to any disclaimer, the term of this patent is extended or adjusted under 35 U.S.C. 154(b) by 438 days.

(21) Appl. No.: 13/179,866

(22) Filed: Jul. 11, 2011

(65) Prior Publication Data

US 2012/0274627 A1 Nov. 1, 2012

Related U.S. Application Data

(60) Provisional application No. 61/479,572, filed on Apr. 27, 2011.

(51) Int. Cl.
*G06T 15/00* (2011.01)
*H04N 13/02* (2006.01)

(52) U.S. Cl.
USPC ............. 348/46; 348/47; 345/419; 382/154

(58) Field of Classification Search
USPC .................. 348/46, 47; 382/154; 700/259
See application file for complete search history.

(56) References Cited

U.S. PATENT DOCUMENTS

| | | | |
|---|---|---|---|
| 6,385,334 B1 * | 5/2002 | Saneyoshi et al. ............ 382/154 |
| 6,392,688 B1 | 5/2002 | Barman | |
| 6,711,293 B1 | 3/2004 | Lowe | |
| 7,224,382 B2 * | 5/2007 | Baker ............................. 348/46 |
| 7,860,301 B2 * | 12/2010 | Se et al. ........................ 382/154 |
| 2008/0117290 A1 * | 5/2008 | Mazza ............................ 348/47 |
| 2008/0215184 A1 * | 9/2008 | Choi et al. .................... 700/259 |
| 2010/0303383 A1 | 12/2010 | Huggett | |
| 2011/0134221 A1 * | 6/2011 | Lee et al. ........................ 348/46 |

OTHER PUBLICATIONS

Ran et al., "Stereo Cameras Self-calibration Based on SIFT", IEEE Computer Society, 2009 International Conference on Measuring Technology and Mechatronics Automation, 2009, pp. 352-355.
David G. Lowe, "Distinctive Image Features from Scale-Invariant Keypoints", International Journal of Computer Vision, 2004, pp. 1-28.

* cited by examiner

*Primary Examiner* — Behrooz Senfi
*Assistant Examiner* — Mohammed Jebari

(57) ABSTRACT

A self calibrating stereo camera includes first and second spatial transform engines for directly receiving first and second images, respectively, of an object. The first and second spatial transform engines are coupled to a stereo display for displaying a fused object in stereo. A calibration module is coupled to the first and second spatial transform engines for aligning the first and second images, prior to display to a viewer. The first and second point extracting modules, respectively, receive the first and second images for extracting interest points from each image. A matching points module is coupled to the first and second point extracting modules for matching the interest points extracted by the first and second point extracting modules. The calibration module determines alignment error between the first and second images, in response to the interest point matches calculated by the matching points module.

9 Claims, 7 Drawing Sheets

WORM SCALED AND ROTATED ACCORDING TO BASE POINT

WORM STARTING FROM BASE POINT

HEAD VECTOR

TAIL VECTOR

ANY TWO INTEREST POINTS

NEARBY POINT
SCALE = 1
DIRECTION = +0°

BASE POINT:
SCALE = 3
DIRECTION = -90°

SELF CALIBRATING STEREO CAMERA

CROSS REFERENCE TO RELATED APPLICATIONS

This application claims priority of U.S. Provisional Patent Application Ser. No. 61/479,572, filed Apr. 27, 2011.

FIELD OF THE INVENTION

The present invention relates, in general, to stereo cameras. More specifically, the present invention relates to a self calibrating stereo camera that does not require factory calibration and can adapt to mechanical and optical changes.

BACKGROUND OF THE INVENTION

Stereo camera systems are used to acquire three-dimensional information about objects. Stereo camera systems are used, for example, in computer vision systems, 3-dimensional tracking applications, object dimensioning applications, object tracking applications, and so on. Typical stereo camera systems include at least two electronic cameras which are mounted at spaced apart locations. The electronic cameras have overlapping fields of view. A computer connected to receive images from each of the cameras can compare the images to derive three-dimensional information about objects in the field of view. Information such as the distances to the objects and the sizes, dimensions and orientations of the objects can be determined by triangulation.

A stereo camera system is typically calibrated by placing a known object in the field of view of the cameras. Computer software which receives images from the cameras can determine the relationship between the cameras from the images of the known object and also compensate for distortions introduced by the lenses. After the stereo camera system has been calibrated then the computer can be used to obtain information about objects whose positions or configurations are not known.

Currently available stereo camera systems use small cameras which have arrays of light sensing elements such as charge coupled devices ("CCDs"), CMOS sensors or the like. A typical camera, as is used in a typical stereo camera system, is mounted to a suitable support in a desired position relative to other camera in the stereo camera system.

A problem with such existing stereo camera systems is that the calibration of the systems can degrade over time. For a stereo camera system to remain perfectly calibrated the fields of view of the cameras must not move relative to one another. In a conventional stereo camera system there is potential for movement in the mounting between the lens holders and the image arrays and there is potential for movement of the support frame itself. It is highly likely that vibration, shocks or the like will cause the field of view of one or more cameras in a stereo camera system to shift over time. If this happens then calibration will be lost.

It has been determined that the performance of a two-camera stereo system can become substantially degraded if any of the cameras moves by more than about ½ pixel relative to the other camera. At currently available camera resolutions each camera should preferably not move relative to the other camera by more than about 0.001 centimeters from the position it had when it was calibrated.

Typically, two lens systems cast images onto two image sensors, configured to run as video cameras. Typically, in such an arrangement, manufacturing tolerances will cause misalignment between each lens and its sensor, and also between one sensor and the other. Moreover, if the lens/sensor combinations have zoom, autofocus or toe-in capability it is likely that the misalignment will change over time.

As will be explained, the present invention can tolerate calibration changes over a period of time and can adapt to mechanical and optical changes over time. The present invention provides a self calibrating stereo camera system that may be performed any time during the life time of the stereo camera system.

BRIEF DESCRIPTION OF THE FIGURES

The invention may be understood from the following detailed description when read in connection with the accompanying figures.

DETAILED DESCRIPTION OF THE INVENTION

As used herein, the phrase "stereo camera" means a device that includes two or more monocular cameras, each observing approximately the same scene from a somewhat different point of view (the camera may be combined in one enclosure).

As will now be explained, the present invention includes a self calibrating stereo video or still camera. The camera may include two lens systems casting images onto two respective image sensors.

To get the best 3D viewing experience, the output images from each camera need to be vertically aligned to within a pixel. Misalignment of the images results in discomfort to the viewer and difficulty in fusing the 3D image. Briefly, in FIG. 1, each camera is connected to a hardware spatial transform engine, as will be described, capable of spatially re-sampling each video frame so as to produce rotated, scaled and shifted images from the input. Rotation in this context means free rotation about 3 axes, not simply in-plane rotation. In other words, the present invention simulates rotations of each camera about any axis.

Interest points may be used as a basis for determining the relative alignment of a stereo pair of images, as will be described. These interest points are matched together, via various methods. Having matched the points, the camera calibration may be determined from single value decomposition analysis of the vertical error. From the camera calibration, the present invention derives the correct settings for each spatial transform engine, so that the output from the spatial transform engines is an aligned pair of images. The spatial transform engines may also be used to improve the comfort of the image to the viewer by optimizing the horizontal disparity as part of the same operation.

Figure 2:
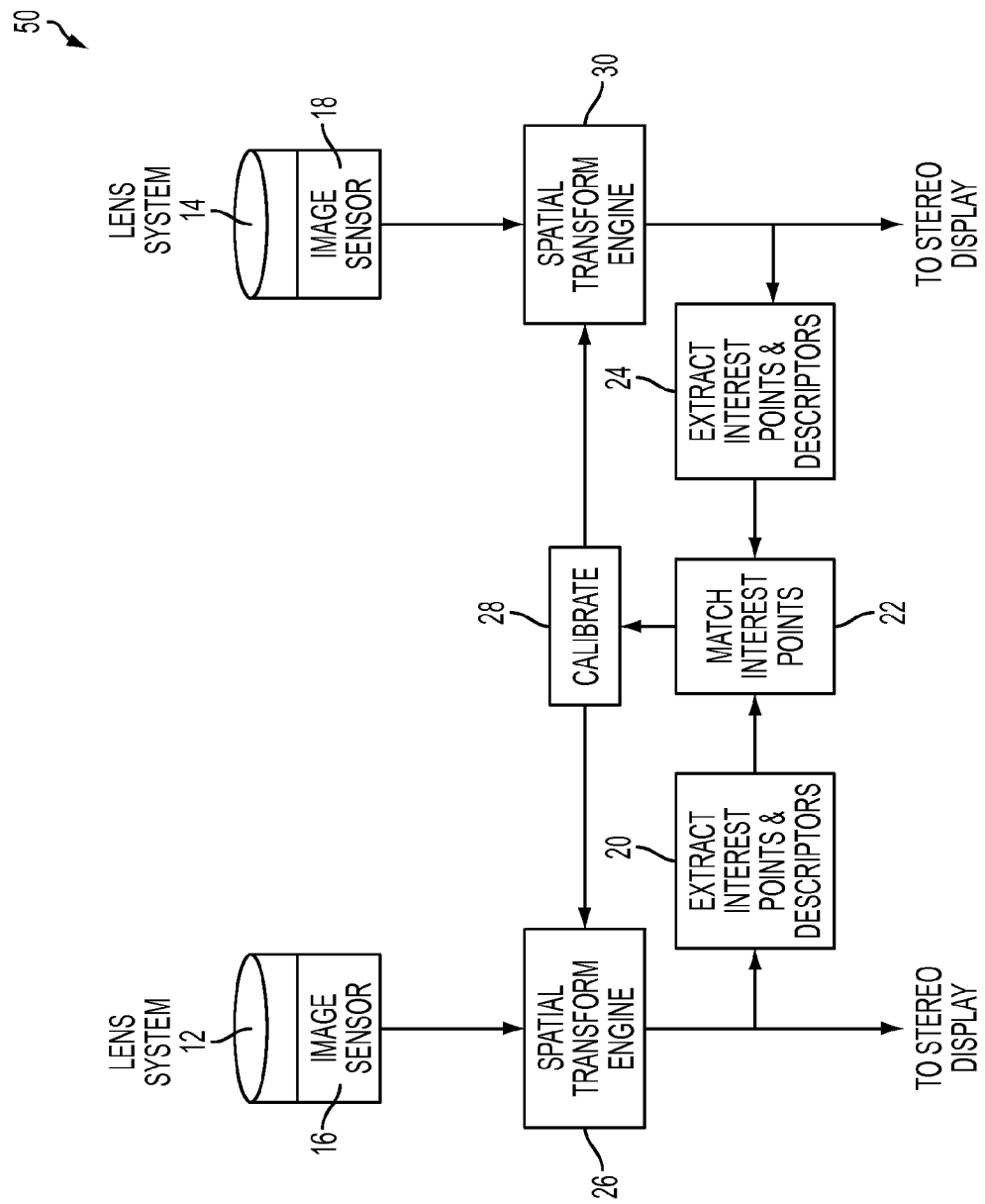
FIG. 2 is another block diagram of a self-calibrating stereo camera system, in accordance with an embodiment of the present invention.

FIG. 2 shows an alternative embodiment, in which processing is performed after the spatial transform engine.

Figure 1:
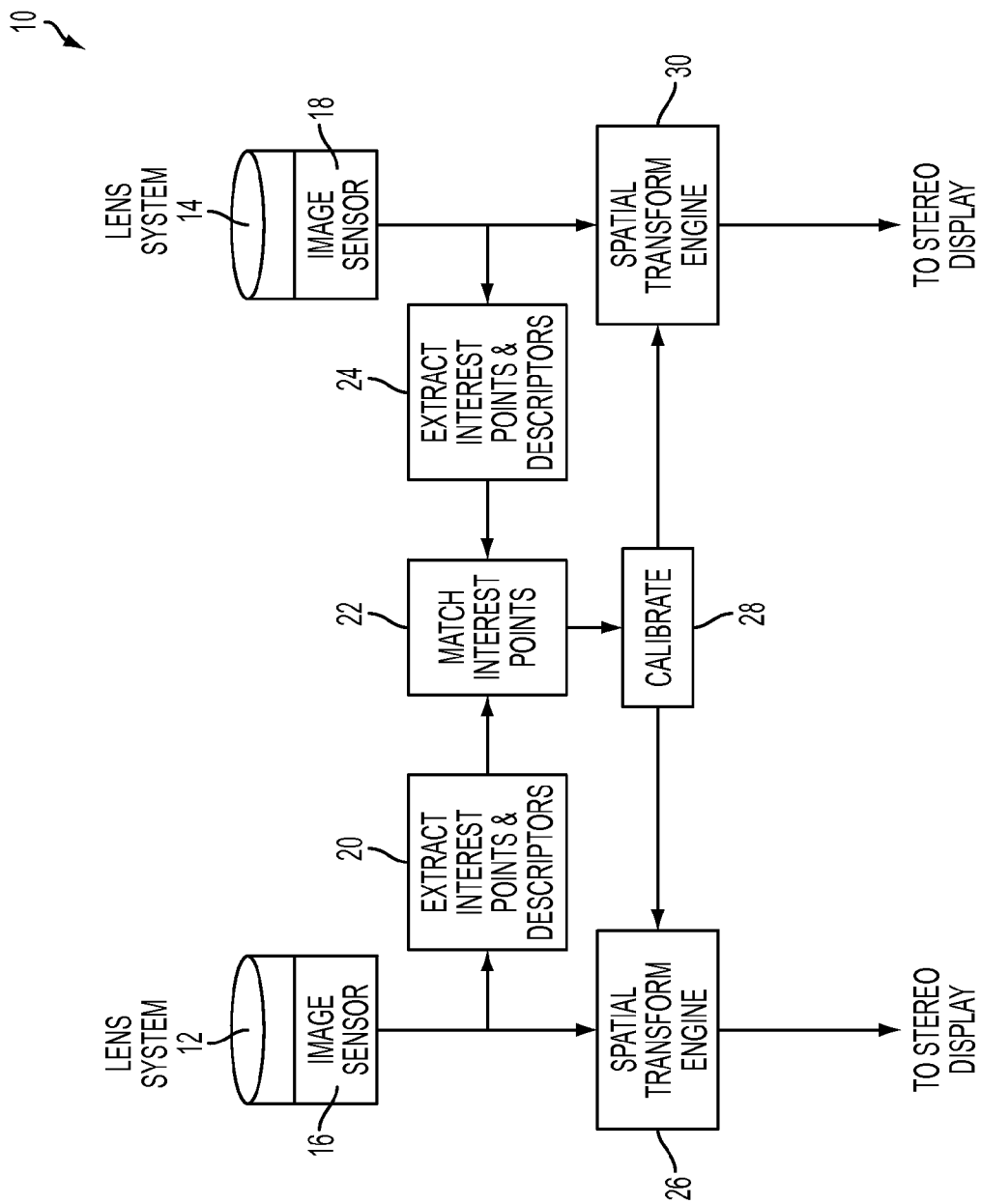
FIG. 1 is a block diagram of a self-calibrating stereo camera system, in accordance with an embodiment of the present invention.

Referring first to FIG. 1, there is shown an embodiment of the present invention as a self-calibrating stereo camera system, generally designated as 10. As shown, stereo system 10 includes at least two individual cameras; one camera has lens system 12 casting images onto image sensor 16, and the other camera has lens system 14 casting images onto image sensor 18.

The stereo system 10 may be hand-held, or mounted on a tripod, camera positioning device such as a pan and tilt unit (PTU), or a robotic manipulator, or a vehicle. The relative locations of the monocular cameras (making up the stereo camera) with one another remain constant, with intersecting fields of view.

Two spatial transform engines (STES) are included with image sensor 16 providing images to STE 26 and image sensor 18 providing images to STE 30. As will be explained, each STE receives input pixel addresses and data associated with the respective addresses, and transforms the input data into output pixel data that is sent to a stereo display unit. Each STE is preferably a hardware configured unit which achieves faster transformations than a software configured unit. Each STE is capable of spatially re-sampling each video frame, so as to produce rotated, scaled and shifted output images from the input images. Rotation in this context means free rotation about 3-axes, not simply in-plane rotation.

In addition, stereo system 10 includes two interest point extractors 20 and 24, respectively, receiving input images from image sensors 16 and 18. Interest points are extracted by modules 20 and 24 as a basis for determining the relative alignment of a stereo pair of images. Various methods may be used for extracting the interest points by the present invention. One method, as will be described, uses a hardware-efficient method for interest point detection.

The present invention uses module 22 to match the interest points extracted by modules 20 and 24. The interest points may be matched using various methods, as later described.

Having matched the interest points from an input image from image sensor 16 with the interest points from an input image from image sensor 18, a calibration module 28 determines the camera calibration from single value decomposition (SVD) analysis of the vertical error. From the camera calibration, the present invention derives the correct settings for each STE. In this manner, the output images from STE 26 and STE 30 are an aligned pair of output images.

It will be appreciated that the present invention may also improve comfort to the viewer by optimizing the horizontal disparity between the images, as part of the same operation that adjusts the vertical disparity between the images.

It will be appreciated that analog signal chain (ASC) circuits, sample and hold (S/H) circuits, and analog-to-digital converters (ADCs), storage registers and image processors required in the image processing pipeline have been omitted in FIG. 1 for the sake of simplicity.

Referring next to FIG. 2, there is shown another embodiment for a self-calibrating stereo camera, generally designated as 50. The self-calibrating stereo camera 50 includes the same elements as self-calibrating stereo camera 10. The interest point extractions (module 20 and 24), the matching of the extracted interest points (module 22) and the calibration of vertical (and horizontal) errors between the input images (module 28) are performed after the spatial transformations (STE 26 and STE 30) in camera system 50; the same stages of processing, however, are performed before the spatial transformations in camera system 10.

The STEs 26 and 30 will now be described in greater detail. An image transform can generally include any suitable transform that creates an output image from an input image. The output image can be created from the entirety of the input image or from any portion of the input image. For example, the output image and the input image can each consist of a set of pixels. The pixels can include information related to their position (e.g., where they are located in the image) and to their data (e.g., the color value of the pixel, the intensity value of the pixel, or both). When performing an image transform on the input image, the pixels of the output image can be calculated from any portion of the pixels of the input image.

Image transforms can include, for example, dewarping, rotations, perspective adjustments, or any other suitable image transform. In a dewarping image transform, a rectilinear version of the input image can be created. Performing a dewarping image transform on the input image may create an output image in which the lines that appeared curved due to the distorting effect of a wide angle lens now appear straight. As another example, a rotation image transform can create an output image that changes the direction in which the camera appears to be pointing. As yet another example, a perspective adjustment image transform can create an output image which makes it seem that the camera that took the input image is positioned in a different location than its actual location.

An image transform can generally include any suitable process that creates an output image from an input image. The output image and the input image can be composed from a set of pixels, where the attributes of each pixel can be determined by its particular pixel information. The pixel information can include, for example, the pixel address (e.g., the location or x-y coordinates of the pixel within the image) and the pixel data (e.g., color value, intensity value, or both).

An image transform can be accomplished through a reverse lookup process. In a reverse lookup process, the process can begin with the output pixel addresses of the output image. Each output pixel address can then be "reverse transformed" to determine a particular input pixel address of the input image.

A reverse image transform is disclosed in U.S. Application No. 2010/0303383, published on Dec. 2, 2010, by inventor Anthony Huggett. This application in incorporated by reference herein in its entirety. A portion of the application is described herein with reference to FIGS. 3 and 4.

Figure 3:
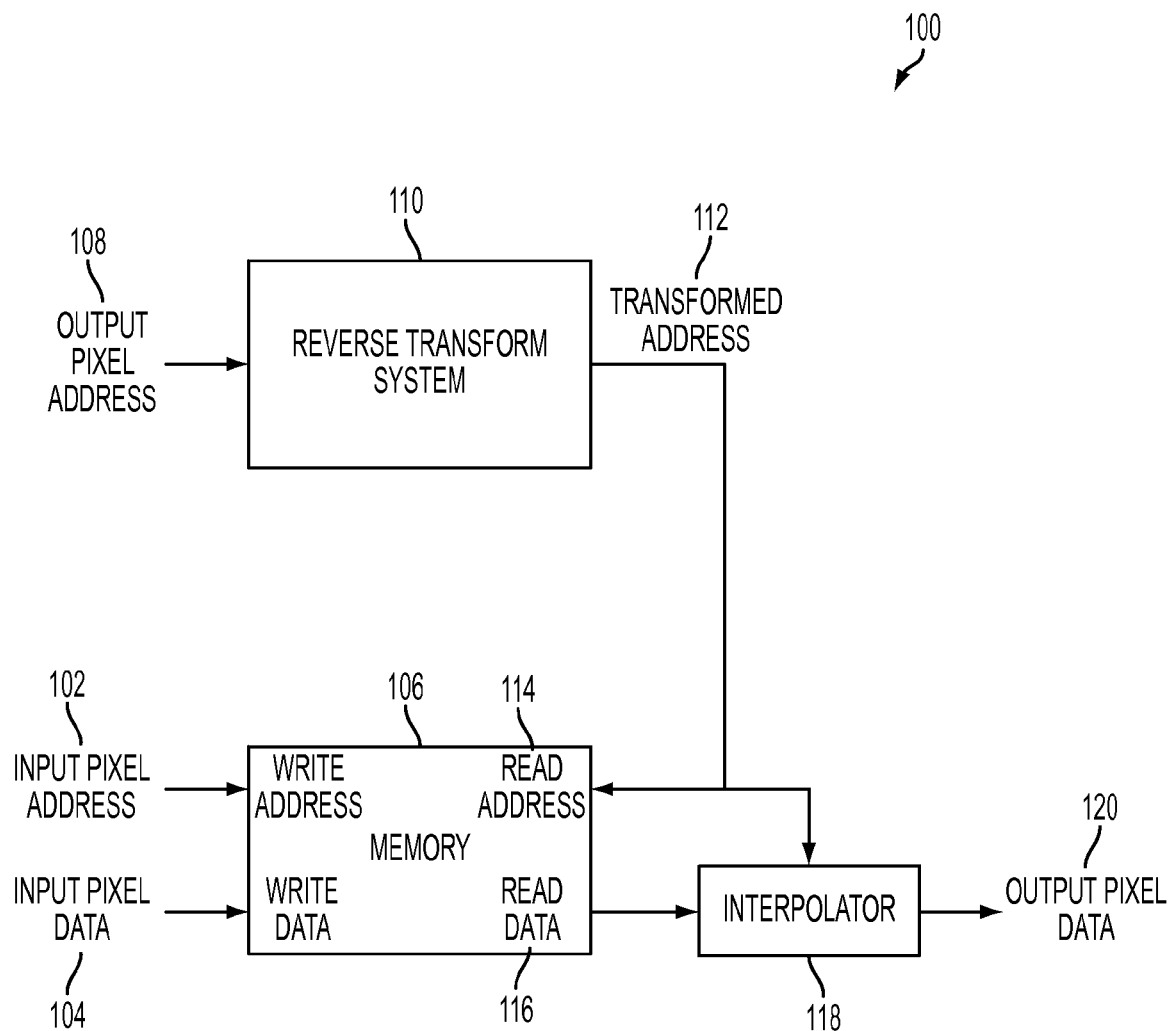
FIG. 3 shows an illustrative reverse lookup system for performing an image transform.

FIG. 3 shows a schematic view of image transform system 100 that can use a reverse lookup process. Input pixel information, such as input pixel address 102 and input pixel data 104, can be written to memory 106. Memory 106 can include any suitable data storage medium such as, for example, a hard-drive, solid state drive, flash memory, permanent memory such as ROM, cache memory, semi-permanent memory such as RAM, or any other suitable type of storage component, or any combination of the above.

Output pixel address 108 can serve as an input to reverse transform system 110. Reverse Transform System 110 can perform any suitable reverse transform on output pixel address 108 to create transformed address 112. Reverse transform system 110 can be, for example, implemented in hardware or dedicated circuitry for performing the reverse transform, implemented in software, or implemented in a hybrid combination of the above.

Transformed address 112 can be used as an input to read address 114 of memory 106. In response to inputting transformed address 112 into read address 114, the input pixel data that is located at transformed address 112 can be output from read data 116 of memory 106. Transformed address 112 can correspond to a fractional pixel address. Accordingly, in this case, the data that is output from read data 116 of memory 106 can correspond to the input pixel data of the input pixels neighboring the pixel at transformed address 112. Interpolator 118 can perform any suitable interpolation calculations on the input pixel data of these neighboring pixels in order to calculate output pixel data 120.

Figure 4:
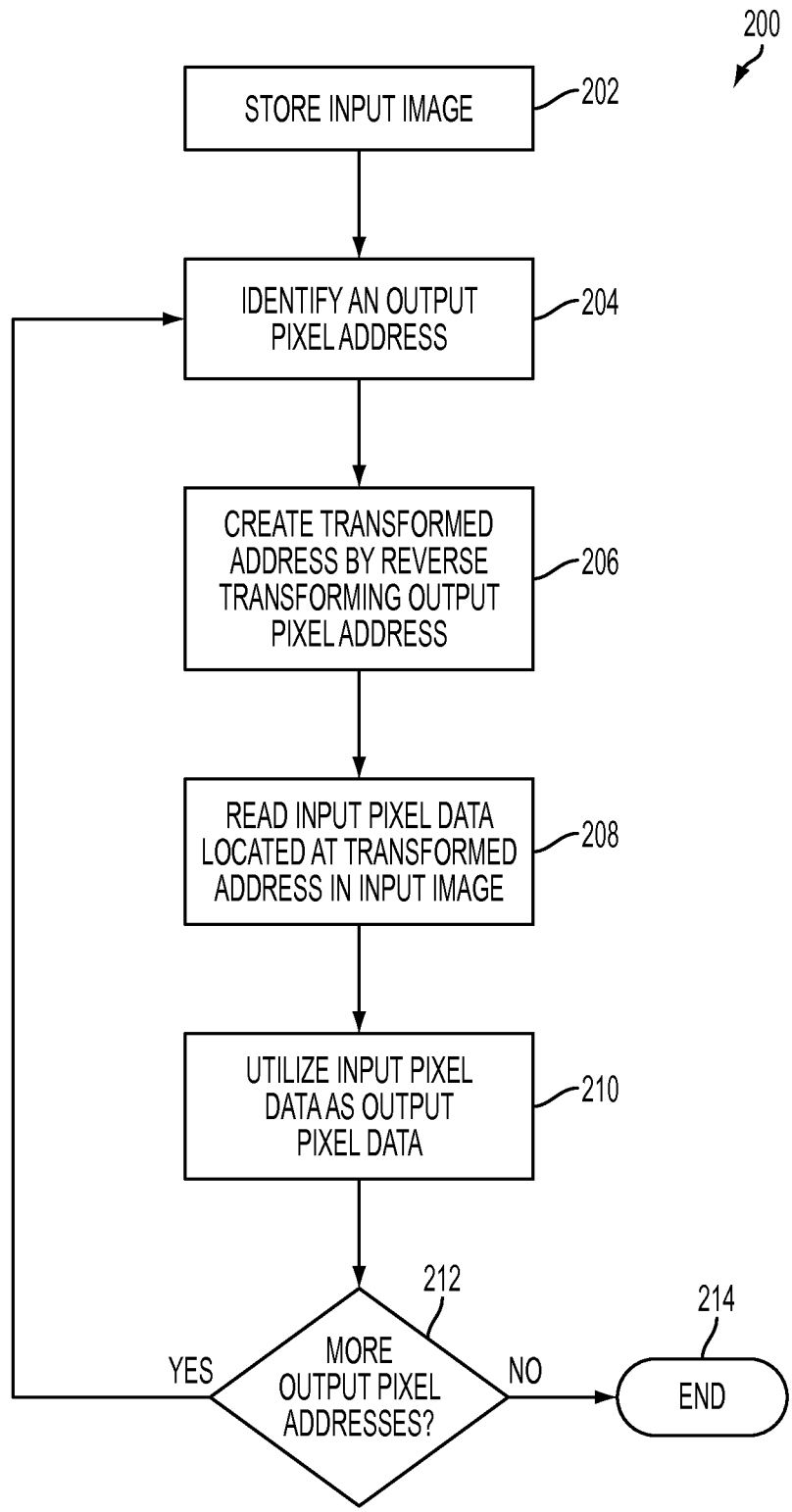
FIG. 4 shows an illustrative process for performing an image transform for the reverse lookup system in FIG. 3.

FIG. 4 shows process 200 that can use a reverse lookup process to perform an image transform. At step 202, process 200 can store the input image. For example, the pixel information (e.g., the pixel addresses and pixel data) can be stored in a memory such as memory 106 of FIG. 3.

At step 204, an output pixel address to be reverse transformed can be identified. For example, every output pixel address of the output image can be incrementally reverse transformed. In this case, a counter can be used to increment the output pixel addresses. Thus, the output pixel address that is currently identified by the counter can be identified at step 204.

At step 206, a transformed address can be calculated by reverse transforming the output pixel address identified at step 204. For example, a system such as reverse transform system 110 of FIG. 3 can be used to calculate the transformed address (e.g., transformed address 112 of FIG. 3).

At step 208, the input pixel data of the input image associated with the transformed address can be read. For example, the transformed address can be used as the read address input to the device that stores the input image at step 202 (e.g., read address input 114 and memory 106 of FIG. 3).

At step 210, the input pixel data that was read at step 208 can be used as the output pixel data of the output image. For example, the input pixel data that was read at step 208 can be associated with the output pixel address identified at step 204 in order to define a pixel of the output image. When the transformed address is a fractional address, the output pixel data can be calculated by interpolating the input pixel data of the input pixels neighboring the fractional address.

At step 212, process 200 can determine whether there are more output pixel addresses to be reverse transformed. If there are more output pixel addresses to be reverse transformed, process 200 can return to step 204. Process 200 can then continue to repeat steps 204, 206, 208, 210, and 212 until all suitable output pixel addresses of the output image have been reverse transformed. In response to all suitable output pixels addresses being reverse transformed, process 200 can end at step 214.

The complexity of and the calculations required to perform a reverse transform (e.g., such as a reverse transform performed by reverse transform system 110 of FIG. 3) can depend upon the type of image transform that is performed (e.g., dewarping, rotation, perspective adjustment, pan, tilt, zoom, or any other suitable image transform). Generally, however, the reverse transform calculations can be relatively complex and large in size in comparison to other types of general calculations. For example, if a dedicated circuit is used to perform the reverse transform calculations, this dedicated circuit may require a substantial amount of microchip space due to the complexity of its circuitry. As another example, if software is used to perform the reverse transform, a substantial amount of computing power may be required for performing this reverse transform.

Accordingly, in some embodiments, a more efficient image transform can be performed by reverse transforming a subset of the output pixel addresses (e.g., as opposed to reverse transforming all of the output pixel addresses). The reverse transformed subset of output pixel addresses can be interpolated in order to "approximately" reverse transform the output pixel addresses. As used herein, the term "approximately transformed address" refers to an estimation of the reverse transform of an output pixel address, where the estimation can be calculated by, for example, interpolation. Furthermore, as used herein, the term "accurately transformed address" refers to an output pixel address that has been reverse transformed (e.g., reverse transformed by a system such as reverse transform system 110 of FIG. 3).

Approximately transformed addresses can require fewer calculations and be less complex to determine than accurately transformed addresses. For example, the hardware necessary to perform a reverse transform can require circuitry that calculates multiple sine or cosine calculations per pixel. The hardware necessary to perform an interpolation, on the other hand, can require smaller and less complex circuitry. For example, the hardware for a bilinear interpolation calculation can include smaller and less complex circuitry such as a few multipliers, a few adders, or both. Accordingly, using an interpolator to approximately reverse transform the output pixel addresses, rather than reverse transforming the entire set of output pixels, can provide for a more efficient image transform. For example, using an interpolator can allow for an image transform system that may require less circuitry and thus may use less power and require less microchip space. Additionally, using an interpolator can allow for computational savings (e.g., in hardware, software, or both) due to the decreased complexity of the required calculations.

The interest point extracting modules 20 and 24 will now be described in greater detail. It will be appreciated that interest points are markers anchored to a specific position in a digital image of an object. They are mathematically extracted in such a way that, in another image of the object, they will appear in the same position on the object, even though the object may be presented at a different position in the image, a different orientation, a different distance or under different lighting conditions. Interest points are combined with data records known as "descriptors" that describe the area of the image surrounding the interest point. Interest points and descriptors are used to identify and correlate related regions in two or more images, such as frames in a video stream.

A number of algorithms that operate upon raw image data and result in the identification of objects, or features of objects are known. An early stage of each of these algorithms that differ in detail, but have many characteristics in common, is the process of interest point detection.

An ideal interest point will always be accurately placed on an object regardless of the presentation of the object to the camera. This property is summarized in the phrase "affine invariant", which means that the interest point is detected even when the object has been reshaped by translation, rotation, dilation and shear. The descriptor must also represent the presentation of the object to the camera. In this way the region surrounding the interest point can be transformed into a standard presentation, enabling comparisons between interest points in different images and corresponding regions detected in several frames.

Interest points are usually expensive to calculate in terms of processor resource, and can easily take 50% or more of the processing resources of a desktop PC to calculate at video frame rates even for small images. All the popular algorithms are optimized to run in software on a desktop computer and require a lot of memory, often several frames' worth, and are constrained to operate serially, one operation at a time.

One established algorithm for extracting a class of interest points or features from images is known as the Scale-Invariant Feature Transform or "SIFT". SIFT is a technique that reduces the effect of normal variations of scale, orientation and lighting. It was first developed by David G. Lowe of the University of British Columbia and described in Lowe, David G.: "Distinctive Image Features From Scale-Invariant Keypoints", International Journal of Computer Vision, 2004.

SIFT is a widely used but computationally demanding technique for feature extraction and image understanding Consider a view of a familiar object, such as a face or a road sign. The human visual system has little difficulty in recognizing such objects regardless, within reasonable limits, of the distance of the object, its orientation and the incident lighting. Simple computer vision systems, on the other hand, that use basic detectors for edges and other features, have great difficulty handling objects at different scales and presentations to the camera. Lighting can be especially problematic when strong shadows introduce false edges, for instance.

Object recognition researchers often use SIFT, implemented in software. There are public open source libraries available that include SIFT functions, for example the VLFeat library online.

SIFT uses the fact that the scale of a feature can be measured by successively blurring the image with a scaling function. The scaling function is a Gaussian blur and can be calculated as a convolution. The features themselves are found by looking for the extrema of the difference of Gaussians function (DoG) between successive scales. The DoG is used as a convenient approximation to what is known as the Hessian blob function.

Each feature, or "key" lies in a 3D space defined by its position (x, y) and a scale a. After applying some tests to reject unsuitable and weak features, the keys are assigned a direction by examining the surrounding intensity gradients and a descriptor is constructed that describes the region near the key as a histogram of slope directions.

SIFT typically extracts several thousand keys in a 3D (x, y, a) space from an image, corresponding to around 1% of the number of pixels. An object to be matched can be represented by a set of keys with a particular interrelationship between their (x, y, σ) coordinates and their orientations. In principle, it should be possible to rescale and rotate a whole set of features (keys) that describe any object so that it is possible to match an observed object to a database.

In SIFT, the blurring process is used to extract the difference of Gaussians (DOG) function, that is an approximation to a Laplacian of Gaussian (LOG) used to indicate a blob response at that scale. In SIFT, after every factor of two increase in scale, the image is decimated, meaning that every other row and every other column is discarded. This reduces the linear resolution by half and the size of the image by three quarters.

An efficient hardware implementation of feature extraction or interest point detection is disclosed in U.S. patent application Ser. No. 13/161,324, filed on Jun. 15, 2011 by inventor, Graham Kirsch. This Application is incorporated herein by reference in its entirety. A portion of the Application is described herein.

As described, a scale pyramid is constructed in a way that is similar to SIFT. Thus, downscaled or decimated image data is generated by blurring the image data received. The downscaled image data represents the blurred data from a pattern of pixel locations in the received image data. Any pattern of pixel locations can be adopted depending on the degree of blurring performed and the extent to which the linear resolution can be reduced without further loss of information. The blurring may be achieved by applying a Gaussian filter to the image data.

Candidate interest points at a first scale are identified by Hessian-filtering the image data and detecting extrema in the Hessian-filtered data. By a Hessian filter is meant any filter that approximates the determinant or trace of the Hessian matrix, such as filters embodying the aforementioned LOG and DOG functions. Candidate interest points at a second scale are identified by Hessian-filtering the downscaled image data and detecting extrema in the Hessian-filtered, downscaled data.

A first adaptation for hardware comes with the recognition that instead of completing the processing of an image and then replacing it wholesale with the next image, the rows of image data can be discarded in series, and in particular that at least one of the rows of image data can be discarded before all the rows of image data have been received. How quickly a row of image data can be discarded depends on a number of factors, including the size of the blurring and Hessian filters, but the key advantage is that there is no need to provide sufficient memory to store a whole image, such as a whole frame of data from a video stream. Instead, it is possible to use smaller quantities of memory, arranged as a line buffer.

More details of interest point extraction or detection configurations are disclosed in the aforementioned U.S. application, which has been incorporated herein by reference in its entirety.

The present invention uses module 22 to match the extracted interest points between modules 20 and 24. The goal is to match interest points in one image with corresponding interest points in another image. Interest points and descriptors are used to identify and correlate related regions in two or more images, such as frames in a video stream. Descriptors are local statistics of a patch of the image around each interest point, typically a local histogram of gradients.

With local descriptors, objects are identified by placing the descriptors for a reference image (desired object) into an unstructured list. To identify the same object in a test image, interest point descriptors are computed for the interest points in the test image. A sufficient number of sufficiently close descriptors indicates that the desired object is present in the test image.

An alternative method that may be used by the present invention matches interest points from one image with interest points in another image or series of images without having to compute descriptors. This is accomplished by relating interest points using objects that are termed "worms". Each worm relates two interest points, one of which is termed a "base interest point" and the other of which is termed a "satellite interest point". The choice of the terms "base" and "satellite" is an arbitrary one. Each worm represents the position of the satellite interest point relative to the base interest point and the scale and orientation of the satellite interest point, but in each case the position, scale and orientation is "normalized", (which here means expressed relative to the scale and orientation of the base interest point). First the worms generated from the interest points of two images are matched and then, from the matched worms, the interest points that are to be matched across images are determined and matched.

A detailed description of matching interest points by using "CANs of worms" is disclosed in U.S. patent application Ser. No. 13/149,824, filed on May 31, 2011, by inventor Anthony Huggett The entire Application is incorporated herein by reference. For the sake of completeness, a portion of the Application is described below by reference to FIGS. 5 and 6.

Figure 5C:
FIG. 5C shows the same worm object after normalizations.
Figure 5B:
FIG. 5B shows a worm object that relates the two interest points shown in FIG. 5A prior to normalization.
Figure 5A:
FIG. 5A shows a base interest point and a nearby satellite interest point.
Figure 5A:
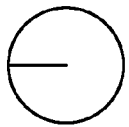

A worm relates a base interest point to a satellite interest point, usually one that is nearby, as shown in FIG. 5A. The tail of the worm is the vector linking the centers of the two interest points; the head is a vector that encodes the scale and principal direction of the nearby point, as shown in FIG. 5B. The worm is then normalized, i.e. scaled and rotated according to the base point scale and rotation. Since in the example shown the base point scale is 3, a scaling factor of ⅓ is applied, and since the rotation is −90°, a rotation of +90° is applied to get the final normalized worm shown in FIG. 5C.

The tail and head vectors are exemplified here as Cartesian vectors (with the y direction being downwards), but the exact representation is not of great importance. The vectors could equally well be represented in polar form, which in some respect is more intuitive.

One worm does not convey much information about the base point. However, the process can be repeated a number of times, for different interest points. This is illustrated in FIG. 6 where a Context-Adaptive Neighborhood (CAN) of worms is shown. A CAN of worms may be generated about every interest point in a scene.

Figure 6A:
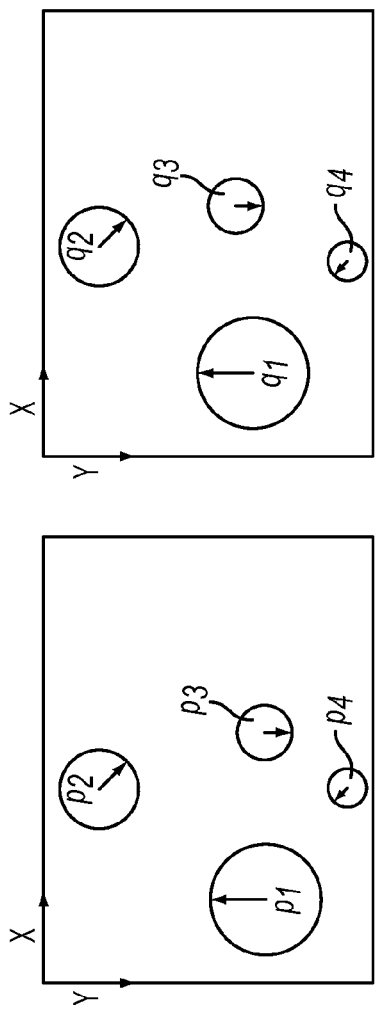
FIGS. 6A-6C show the operation of a basic matching process using CANs of worms.
Figure 6B:
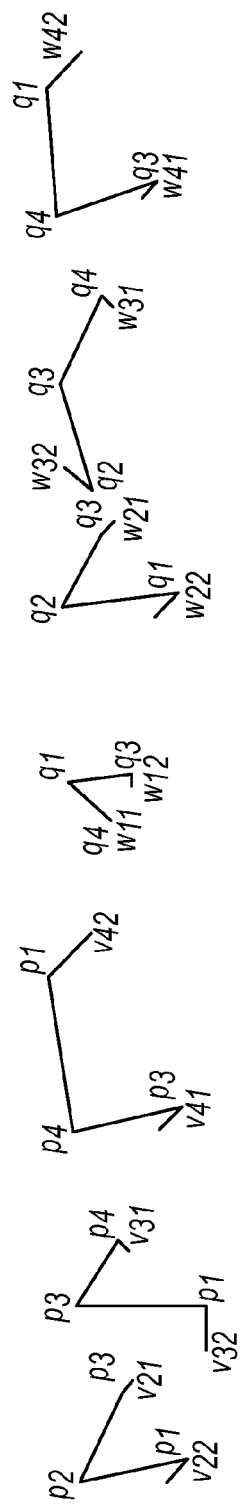

FIG. 6A shows two images, with sets of interest points in each. FIG. 6B shows a CAN of two worms for each point, the CAN of worms taken from the two nearest points in the same set. Although only two worms are shown, there will in general be a greater number of worms in each CAN. Thus, the CAN of worms for point $p_1$ is formed from $p_3$ and $p_4$, etc. Note the difference in the CANs of worms for points $p_3$ and $q_3$ due to a small displacement between $p_3$ and $q_3$ in relation to $p_1$ and $q_1$, respectively.

Figure 6C:
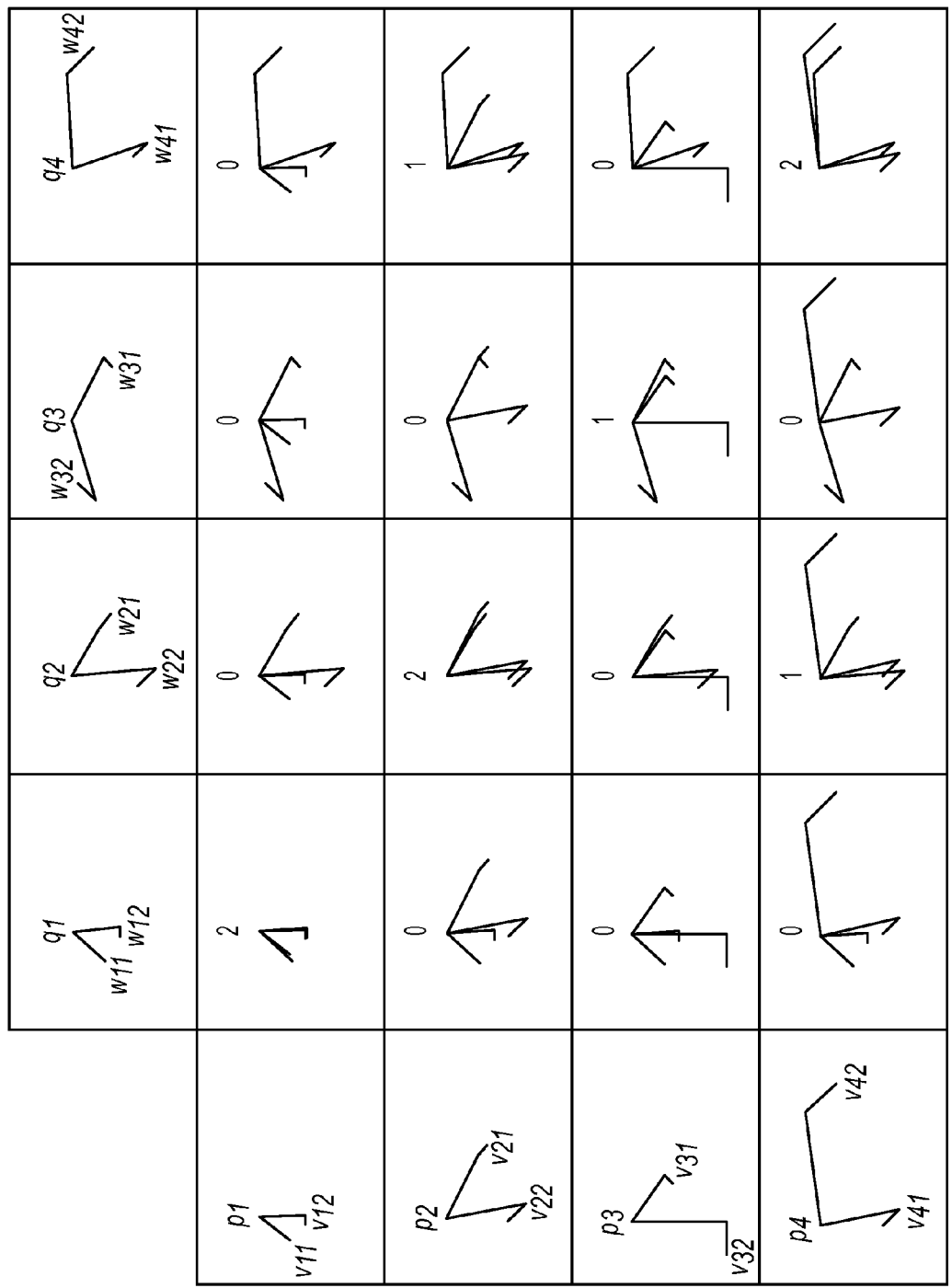

FIG. 6C shows the cross-matching score, which here is simply a count of the number of worms that are similar enough to be matched. The worms are superimposed within each cell of the score array to see the discrepancy. In this simple example, it is easy to see that the interest points to be matched are determined from the identities of the interest points and the number of match pairs that relate them as base interest points.

Note that in this example it has turned out that worms of the same index are the only ones that match. If there are missing points, or points are shifted about a bit more, then this will not be the case. The possibility that worms with a different index are a correct match should not be missed so, for example, $v_{22}$ must be compared with $w_{21}$ as well as $w_{22}$.

A robust algorithm has been developed for finding a dense correspondence between interest points. In essence, it involves choosing the very best matches as true, and using this to increase the score for matches that agree with the chosen matches, while decreasing the score for matches which are precluded by the chosen matches. True matches are discovered not because they can directly be found, but because of the weight of evidence from matches that are already decided. This technique is known as belief propagation. It is useful with CANs of worms because of the spatial relativity of the worms. Connecting the heads of two matching worms together means that there is a strong possibility that the tails originated at a point that also matched. Thus, matching one pair of points increases confidence in the match at other points.

Reference is now made to the calibration module, generally designated as 28. The calibration module determines the best spatial transform to apply to each image, in order to correct for camera misalignment. The spatial transform is typically restricted from the general case of an arbitrary transform to a transform having a small number of degrees of freedom. For instance, each camera may be allowed the freedom to synthetically rotate about 3 axes, giving 6 degrees of freedom in total for the search space.

Mathematical methods are used to minimize the aggregate vertical error between the positions of corresponding pairs of interest points in the output images over the search space, while preserving the maximum common field of view, and rejecting any erroneous matches. Once the correct settings are applied to the STEs, the resultant pictures appear to be captured from aligned cameras in the correct plane.

Additionally, calibration module 28 may adjust the STE settings to improve the viewing comfort by, for instance, minimizing the horizontal disparity under horizontal rotation, keeping the in-plane and vertical rotation planes fixed.

It will be apparent to those of ordinary skill in the art that methods involved in the invention may be embodied not only in hardware but also in a computer program product that includes a machine readable and/or usable medium. For example, such a computer usable medium may include a read only memory device, such as a CD ROM disk or conventional ROM device, or a random access memory, such as a hard drive device or a computer diskette, or a flash memory device having a computer readable program code stored thereon.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A self calibrating stereo camera comprising:
   first and second spatial transform engines for directly receiving first and second input images, respectively, of an object,
   the first and second spatial transform engines coupled to a stereo display for outputting, respectively, first and second output images for display to a viewer,
   a calibration module, coupled to the first and second spatial transform engines, for aligning the first and second output images prior to display,
   first and second point extracting modules, respectively, receiving the first and second output images, for extracting interest points from each output image; and
   a matching points module, coupled to the first and second point extracting modules, for matching the interest points extracted by the first and second point extracting modules,
   wherein the calibration module determines alignment error between the first and second output images, in response to the interest point matches calculated by the matching points module and wherein the matching points module is configured to use Context-Adaptive Neighborhoods (CANs) of worms to match the interest points extracted from the first and second point extracting modules.

2. The self calibrating stereo camera of claim 1 wherein the calibration module determines a vertical error between at least one pair of matched points of interest in the first and second output images.

3. The self calibrating stereo camera of claim 2 wherein the calibration module calculates the vertical error using single value decomposition analysis.

4. The self calibrating stereo camera of claim 1 wherein
   the calibration module is configured to correct settings in the first and second spatial transform engines, and
   the first and second transform engines are configured to transform the first and second input images, respectively, based on the corrected settings.

5. The self calibrating stereo camera of claim 1 wherein
   each of the first and second spatial transform engines are configured to spatially sample a respective input image and output a respective transformed image to the display, and a transformed image from the first spatial transform engine is aligned to a transformed image from the second spatial transform engine.

6. A method of calibrating a stereo camera comprising the steps of:
calibrating vertical errors between pixels of a first image and corresponding pixels of a second image;
correcting the vertical errors between the pixels of the first and second images;
spatially transforming the first and second images, after correcting the vertical errors between the pixels of the first and second images, respectively;
outputting the spatially transformed first and second images to a display for viewing;
extracting interest points from the first and second images;
matching the extracted interest points between the first and second images;
outputting vertical misalignment distances between the extracted interest points, after matching the extracted interest points; and
correcting the vertical errors between the pixels of the first and second images in response to the outputted vertical misalignment distances, wherein matching the extracted interest points includes using belief propagation to match the interest points.

7. The method of claim 6 wherein calibrating vertical errors between pixels of a first image and corresponding pixels of a second image includes determining the vertical errors between pixels using single value decomposition analysis.

8. The method of claim 6 wherein spatially transforming the first and second images includes rotating, scaling, and/or shifting the first image with respect to the second image.

9. The method of claim 8 wherein rotating includes rotating the first image about three axes with respect to the second image.

* * * * *